United States Patent [19]

Dunwoody

[11] Patent Number: 5,058,384
[45] Date of Patent: Oct. 22, 1991

[54] DIGITAL ACTUATOR

[75] Inventor: Andrew B. Dunwoody, Richmond, Canada

[73] Assignee: University of British Columbia, Canada

[21] Appl. No.: 632,944

[22] Filed: Dec. 24, 1990

Related U.S. Application Data

[63] Continuation-in-part of Ser. No. 585,524, Sep. 20, 1990, which is a continuation-in-part of Ser. No. 473,748, Feb. 2, 1990, Pat. No. 5,011,180.

[51] Int. Cl.$^5$ ............................................... F15B 7/00
[52] U.S. Cl. ........................................ 60/533; 60/413; 60/560; 60/583; 60/567; 91/519; 92/107; 92/151; 137/593; 137/596.17
[58] Field of Search ................. 60/533, 538, 545, 560, 60/566, 583, 593, 565, 597.1, 567, 459, 413; 91/519, 443, 463, 409; 92/107, 151, 152; 417/383; 137/593, 116, 596.17, 625.25

[56] References Cited

U.S. PATENT DOCUMENTS

| | | | |
|---|---|---|---|
| 2,992,705 | 7/1961 | Chisnell et al. | 92/107 X |
| 3,068,841 | 12/1962 | Robbins . | |
| 3,880,051 | 4/1975 | Eppler | 92/151 X |
| 4,160,461 | 7/1979 | Vataru et al. | 137/593 X |
| 4,455,828 | 6/1984 | Snitgen | 60/547.1 |
| 4,529,006 | 7/1985 | Block et al. | 137/596.17 X |
| 4,531,451 | 7/1985 | Mouton | 91/519 X |
| 4,569,272 | 2/1986 | Taylor et al. | 91/433 X |
| 4,602,481 | 7/1986 | Robinson . | |
| 4,667,473 | 5/1987 | Robinson | 92/152 X |
| 4,693,273 | 9/1987 | Reynolds et al. | 137/116 X |
| 4,716,812 | 1/1988 | Koerner et al. | 60/413 X |
| 4,785,848 | 11/1988 | Leiber | 137/596.17 |
| 4,834,467 | 5/1989 | Zirps | 60/547.1 X |

FOREIGN PATENT DOCUMENTS

| | | | |
|---|---|---|---|
| 2709386 | 9/1977 | Fed. Rep. of Germany | 91/443 |
| 191783 | 1/1923 | United Kingdom | 60/538 |
| 2037376 | 7/1980 | United Kingdom | 60/583 |

Primary Examiner—Edward K. Look
Assistant Examiner—Todd Mattingly
Attorney, Agent, or Firm—C. A. Rowley

[57] ABSTRACT

A hydraulic actuator is formed by an assembly including a first element, a cylinder, a body section and a chamber. The first element is provided with a first set of a plurality of different sized piston cavities and piston elements which cooperate with a second set of piston elements and piston cavities respectively formed on a second element. The second element forms a piston in cylinder. The body sides incorporates, preferably in symmetrical relationship around the axis, of the assembly a plurality of valves, one valve for each of the pairs of cooperating pistons and cavities. A piston divides the chamber into a high pressure reservoir and a low pressure reservoir with the piston being urged toward the high pressure reservoir to maintain a difference in pressure between the high and low pressure reservoirs. Passages connect each of the valves to the high and low pressure reservoir and each valve with respective of the cavity adapted to selectively connect its respective cavity to either the high pressure reservoir or the low pressure reservoir.

5 Claims, 5 Drawing Sheets

DIGITAL ACTUATOR

This application is a continuation-in-part of application Ser. No. 07/585,524 filed Sept. 20, 1990, pending, which in turn is a continuation-in-part of application Ser. No. 07/473,748 filed Feb. 2, 1990, U.S. Pat. No. 5,011,180 issued Apr. 30, 1991.

FIELD OF THE INVENTION

The present invention relates to an axially, moveable, adjustable, force producing hydraulic actuator. More particularly the present invention relates to a digital hydraulic actuator where the actuator valves for the various cooperating pistons and cavities of the digital actuator, the pistons and cavities, the cylinder and the high and low pressure reservoirs are all contained within a single assembly.

BACKGROUND OF THE PRESENT INVENTION

Generally linear digital hydraulic actuators are limited in those cases where a double action arrangement is required as the total area or range of pressures that may be applied are limited since the forces must be applied to move in both directions. This limits the variation in pressure that may be applied in any one direction or increases significantly the size of the actuator, see U.S. Pat. No. 4,602,481 issued July 29, 1986 to Robinson which discloses a linear double acting digital system of the kind described.

U.S. Pat. No. 3,068,841 issued Dec. 18, 1962 to Robbins et al discloses a system to permit rapid advance of a ram toward a workpiece under low power and low pumping volume requirements and for effecting full force against the work piece after the ram is positioned by utilizing different piston and cylinder sizes to obtain the desired results.

Generally digital actuators are separate elements and are connected to discrete valves and separate reservoir systems all arranged in positions remote from the actuator itself.

BRIEF DESCRIPTION OF THE PRESENT INVENTION

It is an object of the present invention to provide a compact, easily installed, digital hydraulic actuator assembly wherein the various components are provided in a single assembly having a hydraulic output that may be coupled to a suitable hydraulic actuator.

Broadly the present invention relates to a digital hydraulic actuator assembly comprising a cylinder, a body portion including a first element and a chamber integrally interconnected, a second element forming a piston in said cylinder, said first and second elements having sets of cooperating pairs of pistons and cavities, a piston dividing said chamber into a high pressure reservoir and a low pressure reservoir, means urging said piston toward said high pressure reservoir thereby to tend to increase the size of the low pressure reservoir and reduce the size of the high pressure reservoir and thereby generate a pressure differential between hydraulic fluid in said high and said low pressure reservoirs, set of valves in said body portion, said set of valves including one valve for each of said cooperating pairs of piston and cavities, first passage means through said body portion connecting each of said valves to said high pressure reservoir, second passage means connecting said low pressure reservoir to each of said valves, individual passages connecting each of said cavities of said cooperating pairs of pistons and cavities with its respective said valve of said set of valves.

Preferably said cylinder will be hydraulically connected to one side of a hydraulic actuator to drive said actuator in accordance with the pressure in said cylinder.

Preferably said chamber and said cylinder will be positioned at opposite axial ends of said assembly.

Preferably further valve means will be provided in said body portion, further first passage means will connect said further valve means with said high pressure reservoir, a further second passage means will connect said further valve means with said low pressure reservoir and wherein a hydraulic connector will connect to said hydraulic actuator to said further valve means whereby said further valve means may selectively connect said hydraulic actuator to said high or said low pressure reservoir to drive said actuator in the opposite direction to the pressure applied from said cylinder.

Broadly the present invention also relates to a digital hydraulic actuator comprising a fixed element, a driven piston cooperating with a first cylinder formed by said fixed element, means to digitally vary the pressure acting between said fixed element and said driven piston tending to displace said driven piston in said first cylinder, a second cylinder, a hydraulic coupling hydraulically connecting said first cylinder to said second cylinder, said second cylinder having a cross sectional area different from said first cylinder, a working piston in said second cylinder adapted to apply a force determined by the ratio of the cross sectional areas of said first and second cylinders.

Preferably said means to digitally vary the pressure acting between said fixed element and said driven piston includes a first set of different cross sectional area piston cavities and a first set of different cross section area pistons on said fixed element, a second set of different cross sectional area pistons and a second set of different cross sectional area piston cavities on said driven piston, each piston of said second set of pistons being received within said one of said cavities of said first set of piston cavities and each cavity of said second set of piston cavities receiving a piston cavities and each cavity of said second set of piston cavities receiving a piston of said first set of pistons, and means to selectively apply fluid under selected pressures to each cavity of said first and said second sets of cavities.

Preferably said means to selectively apply fluid pressure will apply fluid under a first pressure or a second pressure different from first pressure to each cavity in said first and said second sets of cavities.

Preferably said operating piston will be a double acting piston and means will be provided to apply fluid under pressure under the side of said piston remote from said fluid coupling.

Preferably said hydraulic coupling will comprise a straight tubular passage section interconnecting said first and second cylinders and having a portion changing the cross sectional size of said passage from a cross sectional area equal to that of said first cylinder to a cross sectional area equal to that of said second cylinder.

Preferably said first set of cylinders and said first set of pistons will be concentric and pistons of said first set will separate and form the walls of cavities of said first set.

Preferably said second set of cylinders and said second set of pistons will be concentric and pistons of said second set will separate and form the walls of cavities of said second set.

Preferably means will be provided to adjust the amount of fluid in said fluid coupling to maintain the spacing between said driven and said working pistons within a preselected range.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENT

Figure 1:
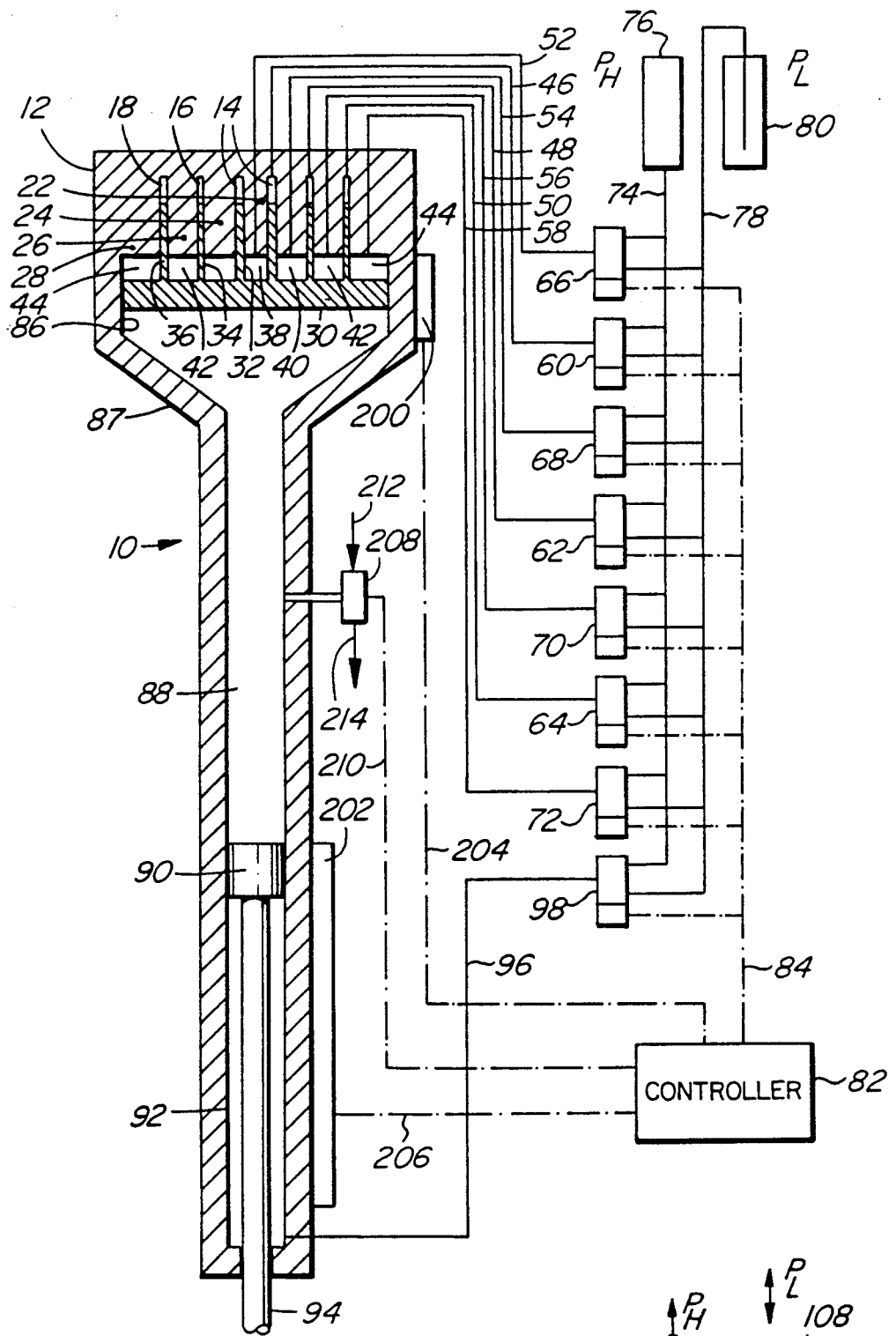
FIG. 1 is a cross-section through a preferred form of digital actuator constructed in accordance with the present invention.

The digital hydraulic actuator 10 illustrated in FIG. 1 includes a first or fixed element 12 having a plurality of annular piston cavities 14, 16, 18 and 20 forming a first set of piston cavities separated (surrounded) by a plurality of annular pistons 22, 24, 26 and 28 forming a first set of pistons.

A driven piston or second element 30 is formed with a plurality of annular pistons 32, 34 and 36 forming a second set of pistons and a second set of discrete annular piston cavities 38, 40, 42 and 44. The second set of pistons 32, 34 and 36 are received within the first set of piston cavities 14, 16 and 18 while the first set of pistons 22, 24, 26 and 28 are received within the second set of piston cavities 38, 40, 42 and 44 respectively. Each of the cavities 14, 16, 18, 34, 40, 42, and 44 are connected via lines 46, 48, 50, 52, 54, 56 and 58 respectively to their respective valves 60, 66, 68, 70 and 72 respectively. Each of these valves are essentially the same and will be described in more detail with respect to FIG. 2. Each is adapted to be moved from first position connecting its respective cylinder to the high pressure line 74 leading from a high pressure tank 76 and designated by the symbol $P_H$ or to the low pressure line 78 connected to the low pressure source of hydraulic fluid 80 as symbolized by the symbol $P_L$. These valves 60, 62, 64, 66, 68, 70 and 72 are controlled via a controller 82 as indicated by the dot/dash lines 84 to apply either a high pressure or a low pressure to each of the cavities and thereby vary the total pressure tending to separate the two elements 12 and 30.

It is preferred that there by a direct relationship between the cross sectional areas of the various cavities of the first and second sets of cavities to obtain a digital effect by properly connecting the various cavities to either the source of high or low pressure to increase the pressure in selected steps, i.e. each cavity will have a cross sectional area that is a direct ratio to the cross sectional areas of the other cavities, e.g. multiples of two.

The actuator 10 of the present invention incorporates an annular extension to the element 12 which forms a first cylinder 86 in which the driven piston or second element 30 mates to form a hydraulic piston 30 and cylinder 86. The axial length of the cylinder 86 is sufficient to accommodate movement of the piston 30 for the full extension of the pistons of the first and second sets of pistons in the second and first sets of piston cavities respectively. The cooperation of the piston 30 in the cylinder 86 guides and better ensures that the small piston elements ie. the pistons of the first and second sets of pistons extending between the driven piston 30 and the first element 12 are not broken.

The cylinder 86 is connected via a hydraulic coupling section 88 to a second cylinder 92 accommodating a second or working piston 90. In the illustrated arrangement this coupling is a straight tubular passage as is preferred, however it could if desired be bent. The cross sectional area of the piston 90 in the illustrated arrangement is significantly less than the cross sectional area of the piston 30 thus a the pressure applied by the piston 30 through the fluid coupling 88 will result in a corresponding pressure applied to the piston 90 and the piston rod 94 connected thereto. If the ratio of the areas of the piston 30 and 90 are 10 to 1 then the force applied to the piston 90 will be 1/10 times that of piston 30 (the total pressures will be essentially the same) and the movement, if the piston 90 is free to move will be such that a 1/10 of an inch movement of the piston 30 will result in a full inch of travel of the piston 90. Thus a significant increase in the travel of the working piston 90 can be obtained through the use of different cross sectional areas of the pistons 30 and 90.

To accommodate the differences in cross sectional areas of the first and second cylinders 86 and 92 the hydraulic coupling 88 has a tapered section 87 gradually changing the cross sectional area from the larger area of cylinder 86 to the smaller area of cylinder 92

To move the element 30 toward the element 12 the side of the piston 90 remote from the coupling 88 is connected via line 96 to a further two position valve 98 that may be connected to the high pressure source while a sufficient number of the cavities of the first and second sets of cavities between the elements 12 and 30 are connected to a low pressure source whereby the pressure acting on the piston 90 in the direction toward the piston 30 is sufficient to force the piston 90 upward in FIG. 1 and force the element or piston 30 to approach the element 12.

As above indicated the valves 60, 62, 65, 66, 68, 70, 72 and 98 may be any suitable valve to connect the actuator to one pressure source or another. In the valve system schematically illustrated in FIG. 2, the valve has a controlled solenoid 100 that moves the body of the valve formed by two interconnected spools 102 and 104 back and forth to open and close the two inlet ports 106 and 108; one for high pressure (106) and one for low pressure (108) intermediate port 110 connects the valve to its respective line 46, 48, 50, 52, 54, 56, 58 or 96.

It will be apparent that as the valve moves to close off one of the ports, say port 106 and open the other port 108, it opens the port 108 before it totally closes off the port 96 as indicated by dimension X. Obviously a similar phenomena occurs when the valve is moved in the opposite direction to close off port 108 and open port 106. The rate of movement of the cylinders 102 and 104 to open and close the ports 106 and 108 is relatively rapid thus the time period in which both ports are simultaneously cracked open is small but it ensures that there is no significant build up of pressure during the transition during the high and low pressure forces.

The description has dealt with only two hydraulic pressures, it will be apparent that more than two could be used with appropriate valve changes so that any one pressure of a number of different pressure could be applied selectively to the cavities.

Figure 3:
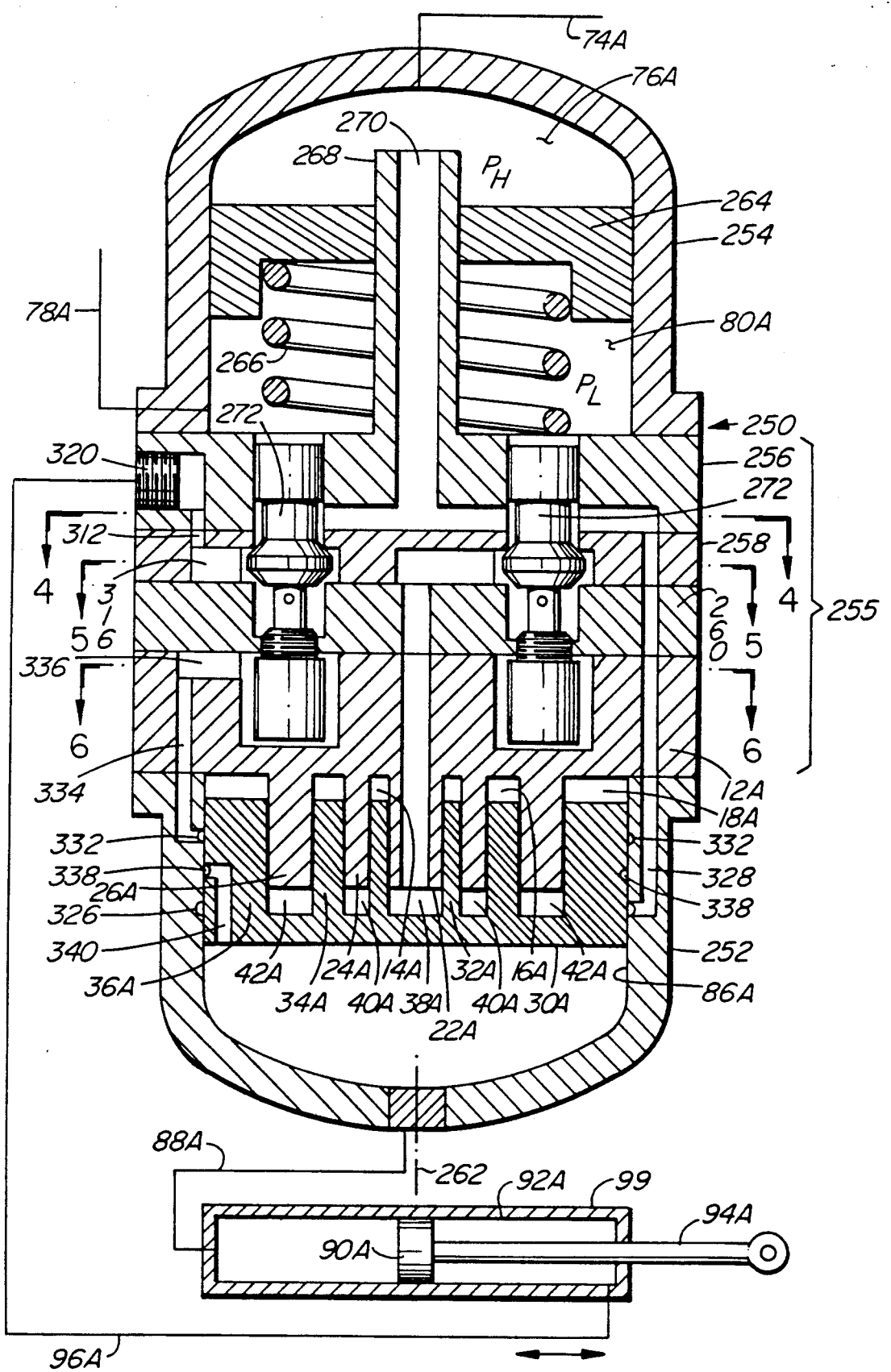
FIG. 3 is a cross section through a preferred form of actuator constructed in accordance with the present invention.

Referring now to FIG. 3 which illustrates a preferred form of the present invention wherein all of the valves, high and low pressure reservoirs and the output cylinder are neatly combined and arranged in an assembly 250.

Figure 2:
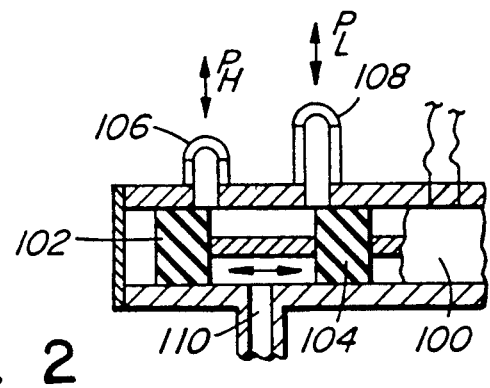
FIG. 2 is a schematic cross section through a typical two-way valve that may be used with the present invention.

In FIG. 3 like parts to those illustrated in FIGS. 1 and 2 have been designated by the same reference numerals followed by the letter A and thus a detailed description of the digital hydraulic system will not be repeated (however, it should be noted that there is one less piston and cavity in the two elements 12A and 30A than with the arrangement shown in FIG. 1, i.e. the piston 28 and its corresponding cavity 44 are not provided in the arrangement shown in FIG. 3). Some of the valves have been generally designated with different numerals than those used in FIG. 1.

The compact digital actuator assembly 250 as shown in FIG. 3 is provided at one axial end with a cylinder section 252 which defines the pressure cylinder 86A which is substantially equivalent to this cylinder 86 of the FIG. 2 embodiment. At the opposite axial end of the unit 250 chamber 254 is provided.

Interposed between the cylinder 252 and chamber 254 is a body portion 255 made up of the first elements 12A (which cooperates with the moveable element 30A (second element) or piston) and a plurality of disc shaped elements 256, 258 and 260 which combine to define the various passages and to hold or contain the valves as will be described hereinbelow.

The assembly 250 has a longitudinal axis 262 about which various elements of the assembly are substantially symmetrically positioned.

The chamber 254 is divided into a high pressure chamber $P_H$ as indicated at 76A and a low pressure chamber $P_L$ 80A by a piston 264. A spring or other suitable means 266 biases the piston 264 toward the high pressure chamber 76A to maintain a pressure differential between the high pressure chamber 76A and the low pressure chamber 80A, i.e. the spring 266 biases the piston 264 to or to tend to reduce the size of the high pressure chamber 76 and increase the size of the low pressure chamber 80A and thereby maintain the pressure differential between the high pressure $P_H$ and the low pressure $P_L$.

In the illustrated arrangement the disc 256 has an axial extension 268 through which a longitudinal passage 270 extends. The piston 264 slides in sealing relationship the axial extension to 68.

Figure 4:
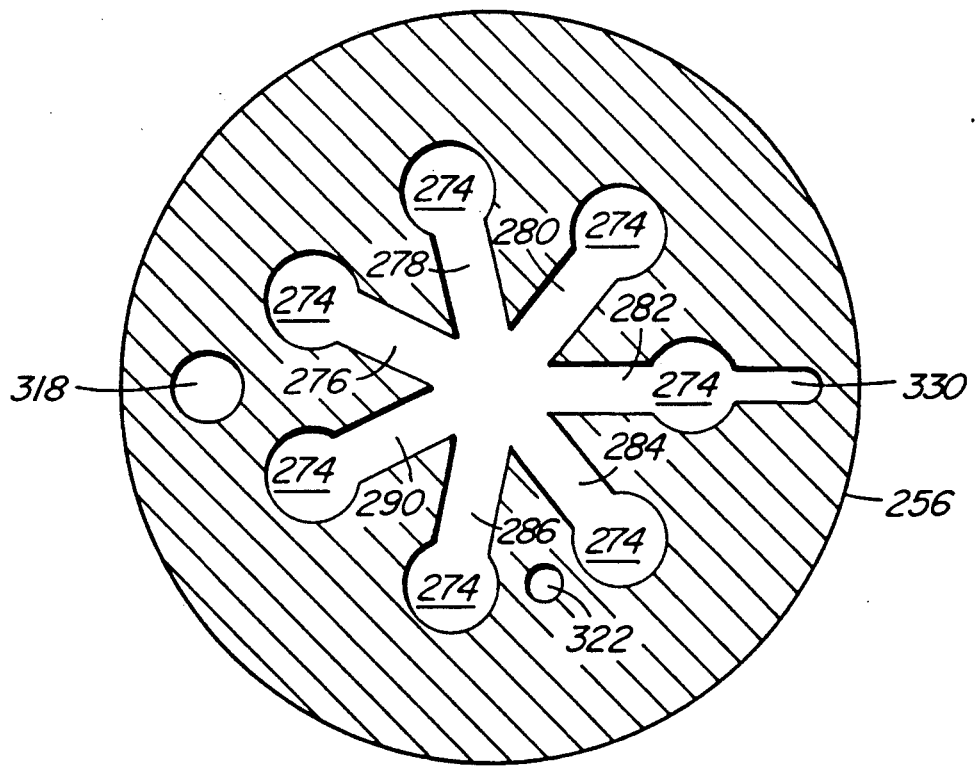
FIG. 4 is a section along the lines 4—4 of FIG. 3.
Figure 5:
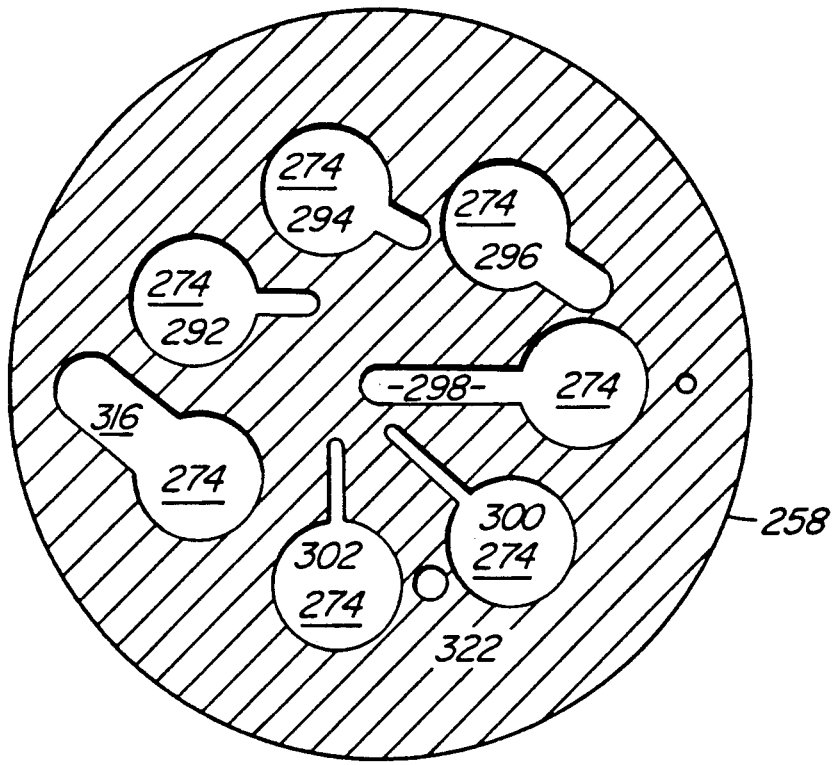
FIG. 5 is a section along the line 5—5 of FIG. 3.
Figure 6:
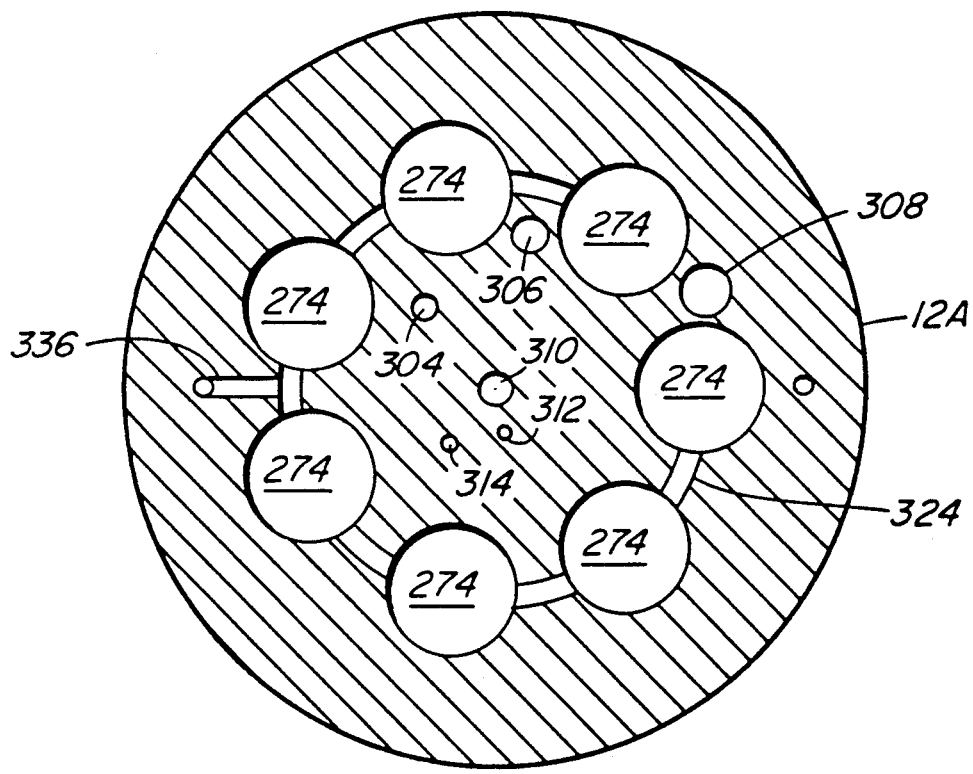
FIG. 6 is a section along the line 6—6 of FIG. 3.

The various valves (described hereinabove as valves 60, 62, 64, 66, etc. generally indicated by the reference numeral 272 (all of the valves are indicated with the same reference numeral) are mounted in the body portions 255 in the elements 12A, 260, 258 and 256 and as well be apparent from FIGS. 4, 5 and 6 are symmetrically positioned about the axis 262 in the cavities 274.

A first passage system connecting the valves 272 to the high pressure chamber 76A is provided by the longitudinal passage 270 which connects to cavities 274 via radial passages 276, 278, 280, 282, 284 and 286.

In reviewing FIG. 4, it will be noted that there is an extra cavity 274 which is adapted to contain a further valve. In this case the valve substantially equivalent to the valve 98 of the previous embodiment, i.e. the further first passage 290 connects the high pressure reservoir or chamber 76A with the valve 272 substantially equivalent to the valve 98.

Each of the valves 272 is connected via a separate passage namely the passages 292, 294, 296, 300 and 302 which connect with their respective axially extending passages 304, 306, 308, 310, 312 and 314 respectively, to their respective cavity of the digital actuator formed by the elements 12A and 30A (see FIG. 6).

Referring again to FIG. 5, the cavity 274 housing the valve equivalent to the valve 96 is provided with a radial passage 316 which connects to an axial passage 318 which in turn connects to fitting 320 for coupling to a hydraulic hose or the like as will be described below.

Low pressure chamber 80A is connected via axial passage 322 (see FIGS. 4 and 5) to a circumferentially extending channel 324 which interconnects the cavities 274 (see FIG. 6).

To ensure proper functioning, piston 30A has been provided with a system for limiting free piston travel to ensure that the piston 30A does not bottom out against the element 12A or against the cylinder end of the cylinder section 252. This travel limiter is formed by an annular groove 326 (see FIG. 3) which connects via axial passage 328, radial extension 330, radial passage 282, passage 270 and thus the high pressure chamber 76A (see FIGS. 3 and 4).

A second annular groove 332 is also provided in the cylinder wall 252 spaced axially from the groove 326 and is connected to a axial passage 334 which connects to a radial passage 336, the interconnecting passage 324, the axial passage 322 and thus to the low pressure reservoir 80A (see FIGS. 3, 4 and 6).

The piston 30A is provided on its outer surface, i.e. around its peripheral with a circumferential groove 338 which is connected via an L shaped passage 340 with the inside of the cylinder 86A.

The travel limiter operates as follows: if the piston 30A moves too close to the cylinder end, i.e. extended too far from the fixed element 12A the groove 338 aligns with the groove 326 thereby connecting inside of the cylinder 86A to the high pressure chamber 76A via the passage 228, etc. thereby forcing the piston 30A towards the element 12A. On the other hand if the piston 30A approaches too closely the element 12A, the groove 338 will align with the groove 332 and connect the cylinder 86A via the line 334, 336, and 338, etc. to the low pressure reservoir 80A so that if there is any of the piston and cavities of the digital actuator system at high pressure the piston 30A will be forced into the cylinder 86A away from the fixed element 12A.

If the present invention were to be incorporated in an active suspension system wherein each wheel of a vehicle would be supported by an actuator 99 formed by, for example, a piston and cylinder arrangement such as the piston and cylinder 90A, 92A with for example, shaft of the piston as indicated at 94A connected to the wheel and the body of the cylinder 92A connected to the body of the vehicle. Regardless of the use to which the system may be applied, the high pressure fluid from the cylinder 86A may be connected to one side of a double piston and cylinder 90A, 92A by a line 88A providing a unit pressure to the piston 90A essentially equal to the unit pressure within the cylinder 86A.

On the opposite end of the piston and cylinder 90A, 92A, i.e. the chamber 92A is connected by a suitable coupling such as a hose coupling as indicated at 96A to the connectors 320 and thus equivalent to valve 96 which will normally be connected to the low pressure reservoir 80A. To drive the piston 90A in the opposite direction valve equivalent to the valve 96 will be shifted to direct high pressure fluid into the chamber 92A as above described.

Figure 7:
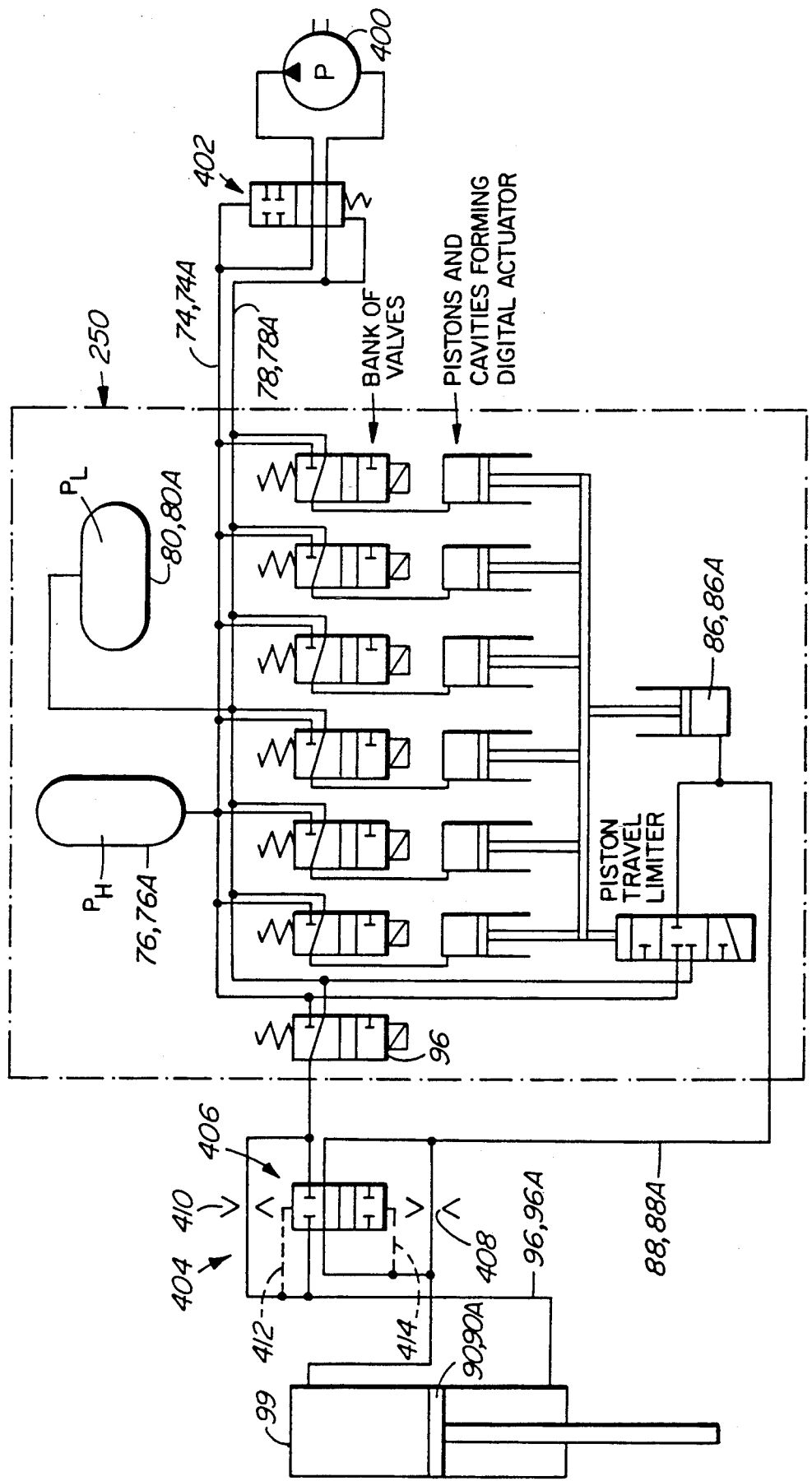
FIG. 7 is a schematic illustration of a system constructed in accordance with the present invention and further including an actuator throttle.

FIG. 7 provides a schematic illustration somewhat similar to FIG. 1 further incorporating a pump 400 that is connected via a valve 402 to the high and low pressure lines 74 (74A) 78 (78A) respectively which in turn are connected to the high and low pressure reservoir 76 (76A) and 80 (80A) respectively.

The system illustrated in FIG. 7 further includes an actuator throttle 404 the purpose of which is to limit the speed of the working piston 90 (90A), 94 (94A) when there is no load on the working piston.

The actuator throttle 404 includes a throttle valve 406 which is adapted to connects the pressure line from the cylinder 86, 86A through a throttling orifice schematically illustrated at 408 or in the position illustrated to bypass this throttling orifice 408 and be connected directly with the cylinder 86, 86A. Similarly the return line 96, 96A may be connected through to the low pressure reservoir 80, 80A via an orifice 410 as illustrated by shifting the valve 406 directly to the low pressure reservoir 80, 80A.

Shifting of the valve 406 is attained by the difference in in hydraulic pressure applied to opposite ends of the valve 406 via the valve control pressure lines 412 and 414 connected to the lines 96 (96A) and 88 (88A) respectively. The throttle 404 operates as follows. With no load applied to the working piston 90 (90A), there is no pressure differential across the working piston and therefore the entire pressure differential is applied across the throttle. The flow rate through the throttle, hence the speed of the piston is a function of the size of the throttle orifice 408 or 410 and the pressure differential applied across it. In the extreme case, with no motion of the piston there can be no pressure differential across the throttle and the full pressure differential is applied across the working piston. The valve 406 insures that the throttle is always applied across the flow line 88 or 96 from the actuator 99 which is at the higher pressure. This throttle also helps to prevent cavitation.

It will be evident that to incorporate the assembly into a system four connections are required, namely one to cylinder 86A (i.e. line 88A0, one to fitting 320, a low pressure line to the reservoir 80A and a high pressure line to reservoir 76A.

Having described the invention modifications will be evident to those skilled in the art without departing from the spirit of the invention as defined in the appended claims.

I claim:

1. A digital hydraulic actuator assembly comprising a cylinder, a body portion having a first element, and a chamber integrally interconnected, said first element cooperating with a second element that forms a piston in said cylinder, said first and second elements having sets of cooperating pairs of pistons and cavities adapted to cooperate to form a digital hydraulic actuator, a piston dividing said chamber into a high pressure reservoir and a low pressure reservoir, means for urging said piston toward said high pressure reservoir to generate a differential in pressure in hydraulic fluid filling said high and said low pressure reservoirs, set of valves in said body portion, said set of valves including one valve for each of said cavities, a first passage means through said body portion connecting each of said valves to said high pressure reservoir, a second passage means in said body portion connecting said low pressure reservoir to each of said valves, individual passages through said body portion connecting each of said cavities with its respective valve of said set of valves.

2. An actuator assembly as defined in claim 1 wherein said valves of said set of valves are symmetrically positioned around the longitudinal axis of said assembly.

3. An actuator assembly as defined in claim 2 further comprising means for coupling said cylinder to a hydraulic actuator to deliver hydraulic fluid under pressure from said cylinder to one side of said hydraulic actuator.

4. An assembly as defined in claim 2 wherein said chamber and said cylinder are at axial opposite ends of said body portion.

5. An assembly as defined in claim 2 wherein said first passage means includes a passage extending substantially along the longitudinal axis of said assembly through a shaft projecting into said chamber and wherein said piston surrounds and slides axially along said shaft in sealed relationship thereto.

* * * * *